(12) United States Patent
Movsesian

(10) Patent No.: US 10,989,346 B2
(45) Date of Patent: Apr. 27, 2021

(54) AUTOMATIC FLOW RESTRICTOR FOR A WATER DISTRIBUTION SYSTEM

(71) Applicant: Ara John Movsesian, Fresno, CA (US)

(72) Inventor: Ara John Movsesian, Fresno, CA (US)

(*) Notice: Subject to any disclaimer, the term of this patent is extended or adjusted under 35 U.S.C. 154(b) by 0 days.

(21) Appl. No.: 16/820,188

(22) Filed: Mar. 16, 2020

(65) Prior Publication Data

US 2020/0300402 A1 Sep. 24, 2020

Related U.S. Application Data

(60) Provisional application No. 62/819,987, filed on Mar. 18, 2019.

(51) Int. Cl.
*F16L 55/10* (2006.01)
*G05D 7/01* (2006.01)

(52) U.S. Cl.
CPC ........ *F16L 55/1018* (2013.01); *G05D 7/0173* (2013.01)

(58) Field of Classification Search
CPC .... F16L 55/1018; F16L 55/1022; B05B 1/30; B05B 1/3006; B05B 12/085–12/087; G05D 7/0173; G05D 7/0153
USPC ......... 137/456, 459–460, 517, 521; 239/393, 239/396, 581.1, 570–572, 533.15
See application file for complete search history.

(56) References Cited

U.S. PATENT DOCUMENTS

| 1,454,280 | A | * | 5/1923 | Henrikson | B05B 1/1636 |
| | | | | | 239/116 |
| 2,796,293 | A | * | 6/1957 | Becker | B05B 15/74 |
| | | | | | 239/204 |
| 6,367,501 | B2 | * | 4/2002 | Svehaug | F16K 17/30 |
| | | | | | 137/513 |
| 9,707,587 | B2 | * | 7/2017 | Perez | B05B 15/74 |
| 2017/0227158 | A1 | * | 8/2017 | Supnekar | F16K 3/08 |

* cited by examiner

*Primary Examiner* — Michael R Reid

(74) *Attorney, Agent, or Firm* — Welsh Flaxman & Gitler LLC

(57) ABSTRACT

An automatic flow restrictor for a sprinkler head. The flow restrictor includes a first disk and a second disk. The first disk and the second disk move relative to each other so as to take a first orientation where water being pumped through a main line tubing member is free to pass through the flow restrictor and exit out the sprinkler head with little resistance to flow, and a second orientation where water is restricted from passing therethrough. The first disk includes a top surface and a bottom surface. The first disk further includes a plurality of apertures extending directly between the top surface and the bottom surface. The second disk includes a top surface and a bottom surface. The first disk further includes a plurality of apertures extending directly between the top surface and the bottom surface, wherein a fan blade is aligned with each of the plurality of apertures.

20 Claims, 14 Drawing Sheets

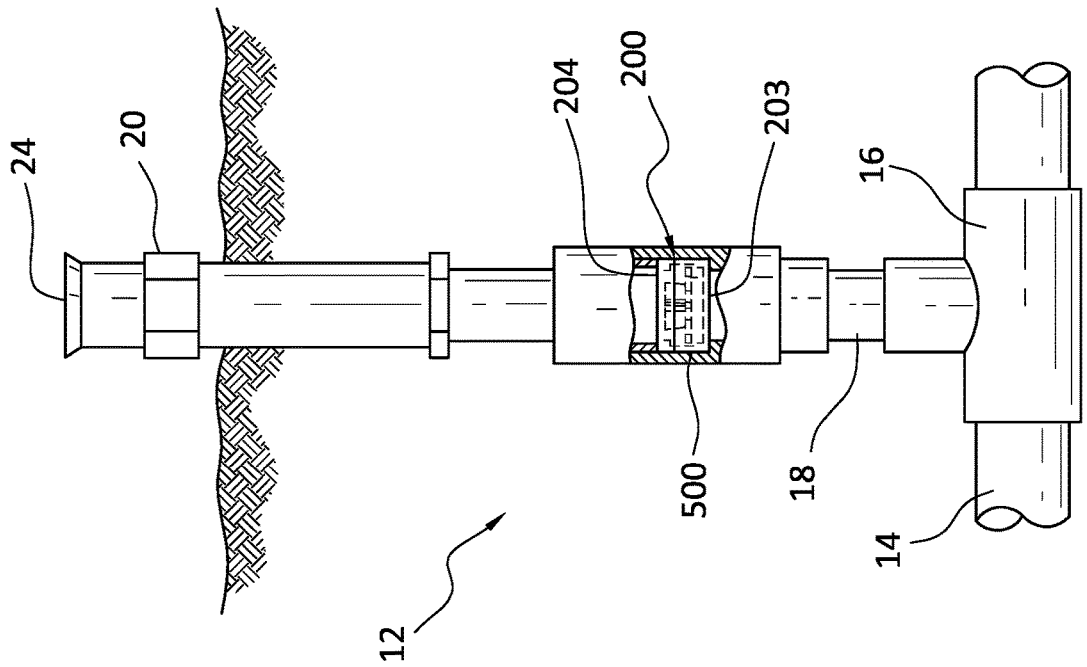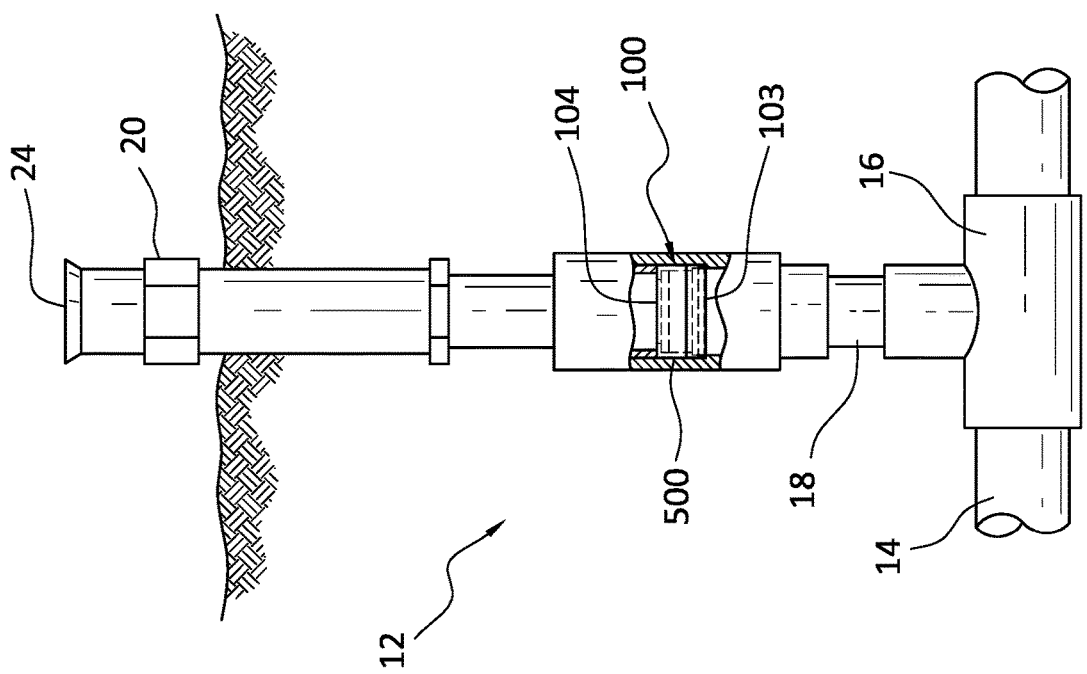

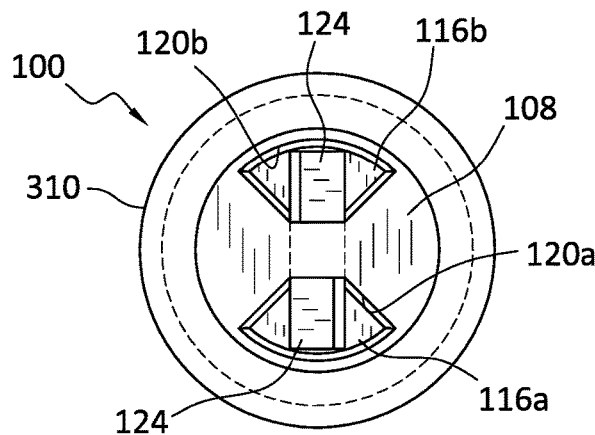
FIG. 7A
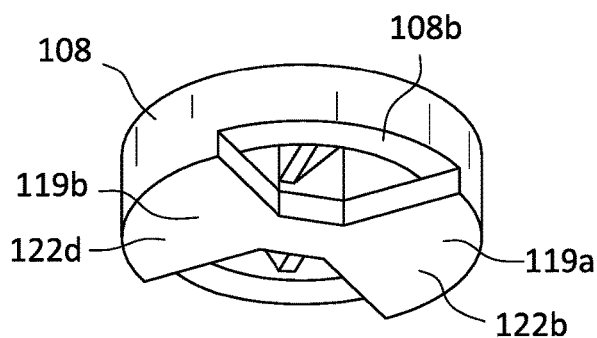
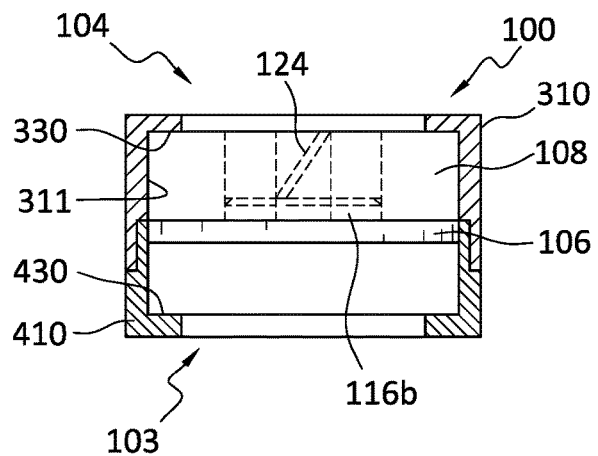
FIG. 7B
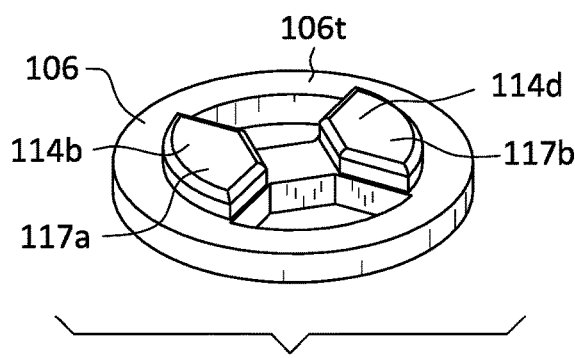
FIG. 8

AUTOMATIC FLOW RESTRICTOR FOR A WATER DISTRIBUTION SYSTEM

CROSS REFERENCE TO RELATED APPLICATION

This application claims the benefit of U.S. Provisional Application Ser. No. 62/819,987, entitled "AUTOMATIC FLOW RESTRICTOR FOR A WATER DISTRIBUTION SYSTEM," filed Mar. 18, 2019, which is incorporated herein by reference.

BACKGROUND OF THE INVENTION

1. Field of the Invention

The present invention relates to an automatic flow restrictor for a water distribution system, for example, a sprinkler head.

2. Description of the Related Art

Sprinkler systems generally employ a vertical riser extends upwardly to the surface where it is capped by a sprinkler head. However, it is known that sprinkler head may be broken resulting in a rapid increase in water flow occurs. As such, it is desirable to provide such system with a restrictor mechanism to stop of the flow of water in the event of a broken sprinkler head.

SUMMARY OF THE INVENTION

According to a first aspect there may be provided an automatic flow restrictor for a sprinkler head. The flow restrictor includes a first disk and a second disk. The first disk and the second disk move relative to each other so as to take a first orientation where water being pumped through a main line tubing member is free to pass through the flow restrictor and exit out the sprinkler head with little resistance to flow, and a second orientation where water is restricted from passing therethrough. The first disk includes a top surface and a bottom surface. The first disk further includes a plurality of apertures extending directly between the top surface and the bottom surface. The second disk includes a top surface and a bottom surface. The first disk further includes a plurality of apertures extending directly between the top surface and the bottom surface, wherein a fan blade is aligned with each of the plurality of apertures.

In some embodiments the flow restrictor includes a housing in which the first disk and the second disk are positioned.

In some embodiments the housing includes cylindrical first and second housing members that are shaped and dimensioned for positioning within a riser.

In some embodiments the apertures of the first disk and the apertures of the second disk are generally arcuate shaped.

In some embodiments the apertures of the first disk and the apertures of the second disk are symmetrically positioned about a circumference thereof.

In some embodiments the first disk includes two apertures and the second disk includes two apertures.

In some embodiments the first disk includes three apertures and the second disk includes three apertures.

In some embodiments the top surface of the first disk includes raised pads shaped and dimensioned to fit within the apertures of the second disk that are opposed to the first disk.

In some embodiments the fan blades of the second disk are fully positioned within a void defined by the apertures of the second disk.

In some embodiments the fan blades of the second disk are sized to extend external beyond a void defined by the apertures such that they extend beyond both the top surface of the second disk.

In some embodiments the fan blades are integrally formed with the second disk.

In some embodiments the fan blades are separately formed with a central supporting member that is positioned at a center point of the second disk.

Additional advantages of the embodiments will be set forth in part in the description which follows, and in part will be understood from the description, or may be learned by practice of the invention. The advantages will be realized and attained by means of the elements and combinations particularly pointed out in the appended claims.

BRIEF DESCRIPTION OF THE DRAWINGS

FIG. 1 is a side elevation view of a water distribution system in accordance with a first embodiment.

FIG. 2 is a side elevation view of a water distribution system in accordance with a second embodiment.

FIGS. 5A-B, 6A-B, and 7A-B respectively showing a top plan view and a cross sectional view of the automatic flow restrictor shown in FIGS. 3 and 4 in various stages of use showing the automatic flow restrictor allowing free flow, partial flow, and full flow restriction.

FIG. 8 is an exploded view showing an alternate embodiment of the automatic flow restrictor.

DESCRIPTION OF THE PREFERRED EMBODIMENTS

Figure 3:
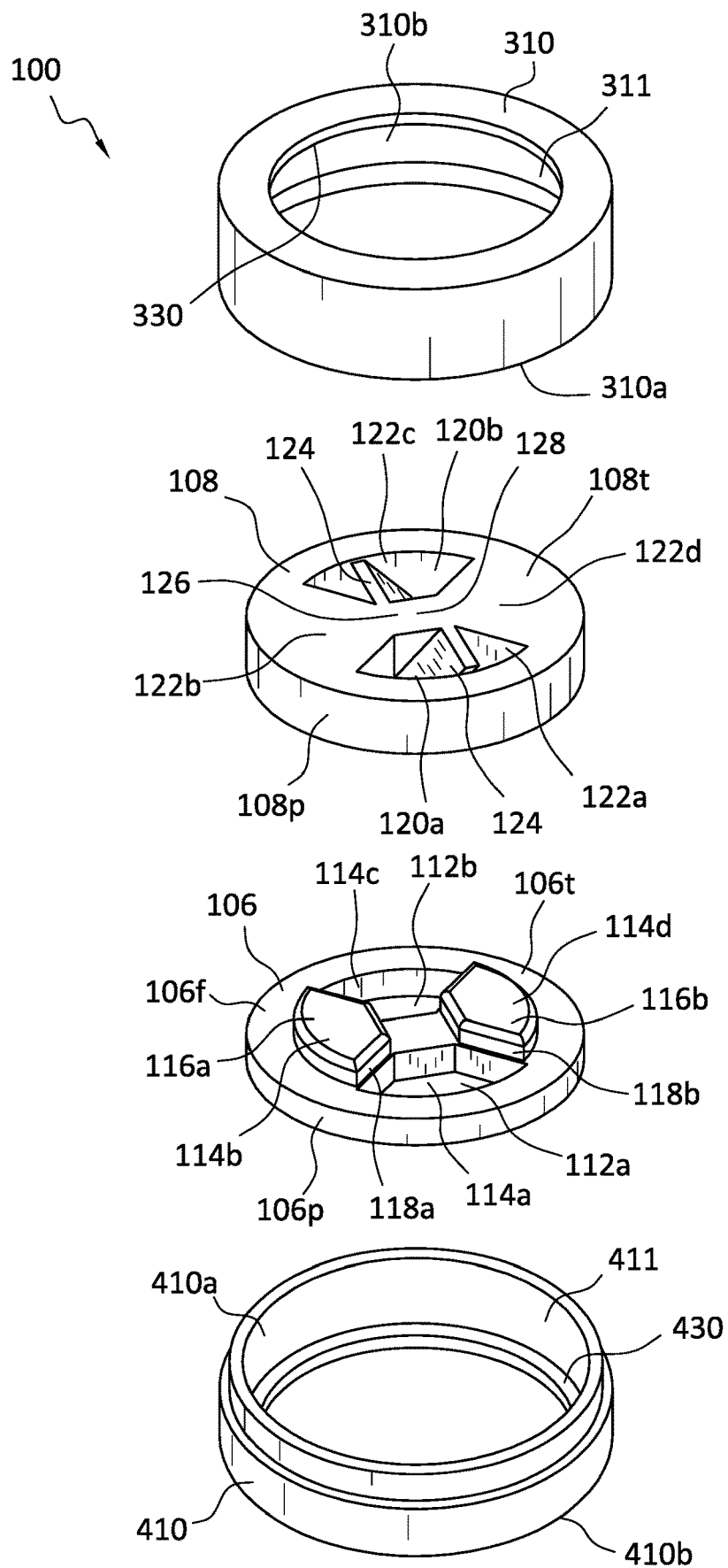
FIG. 3 is an exploded top view of the automatic flow restrictor in accordance with a first embodiment and as shown in FIG. 1.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to the various figures, an automatic flow restrictor 100, 200 for a sprinkler head 24 is disclosed. The flow restrictor 100, 200 operates to reduce the flow of water from the sprinkler head 24 when the sprinkler head 24 is broken and a rapid increase in water flow occurs. The possible materials of construction include, but are not limited to, plastics of various types, rust-resistant metals, such as brass and copper, and other water-resistant, dimensionally-stable materials.

While the automatic flow restrictor of the present invention is disclosed herein for use in conjunction with a traditional irrigation system in a specific implementation, it is appreciated the automatic flow restrictor may be used in conjunction with a variety of water control systems within the spirit of the present invention.

As those skilled in the art will appreciate, a traditional irrigation system 12 includes a plurality of main line tubing members 14 that are connected to coupling members 16 of various shapes. At some of the coupling members 16 a riser 18 is positioned so as to extend upwardly from the coupling member 16. A sprinkler head 24 is then connected to the top end 20 of each of the risers 18.

Within the riser 18 is positioned the flow restrictor 100, 200 in accordance with present invention. The flow restrictor 100, 200 includes an inlet end 103, 203 and an outlet end 104, 204, wherein the inlet end 103, 203 is positioned so as to face the main line tubing member 14 and the outlet end 104, 204 is positioned so as to face the sprinkler head 24.

Referring to FIGS. 3-14, the flow restrictor 100, 200 is composed of first and second disks 106, 108, 206, 208 capable of moving relative to each other so as to take a first orientation where water being pumped through the main line tubing member 14 is free to pass through the flow restrictor 100, 200 and exit out the sprinkler head 24 with little resistance to flow, and a second orientation where water is restricted from passing therethrough. The first and second disks 106, 108, 206, 208 are positioned within cylindrical first and second housing members 310, 410 that are shaped and dimensioned for positioning within the riser 18.

Each of the disks 106, 108, 206, 208 is shaped and dimensioned along its outer periphery so as to snugly fit within and between the first and second housing members 310, 410 (which combined define a complete housing 500) such that the disks 106, 108, 206, 208 can rotate but water-flow is minimized between the outer periphery 106p, 108p, 206p, 208p of the disks 106, 108, 206, 208 and the inner walls 311, 411 of the respective cylindrical housing members 310, 410. Further still, each disk 106, 108, 206, 208 includes a top surface 106t, 108t, 206t, 208t and a bottom surface 106b, 108b, 206b, 208b.

Considering now the first disk 106, 206, which, in accordance with a preferred embodiment, can have several configurations. The common elements amongst these configurations are that the first disk 106, 206 includes a plurality of apertures 112a-b, 212a-c extending directly between the top surface 106t, 206t thereof and the bottom surface 106b, 206b thereof. The apertures 112a-b, 212a-c are generally arcuate shaped and are symmetrically positioned about the circumference of the first disk 106, 206.

Figure 4:
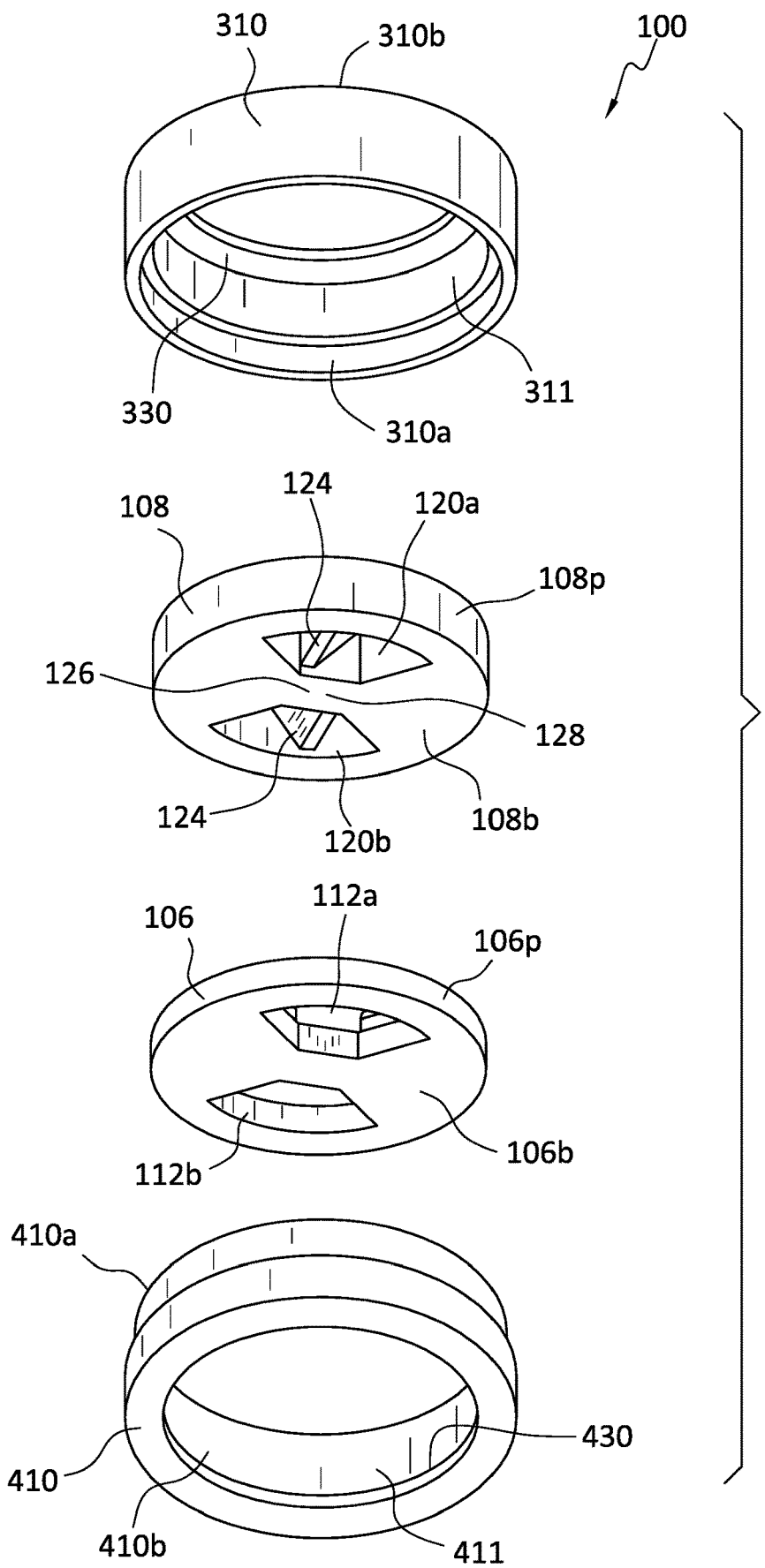
FIG. 4 is an exploded bottom view of the automatic flow restrictor in accordance with the first embodiment as shown in FIG. 3.
Figure 5A:
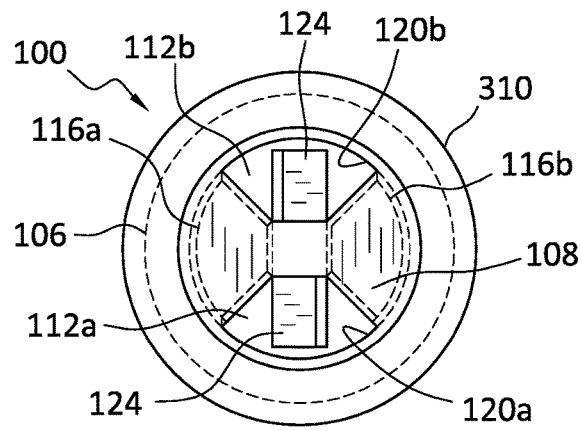
Figure 6A:
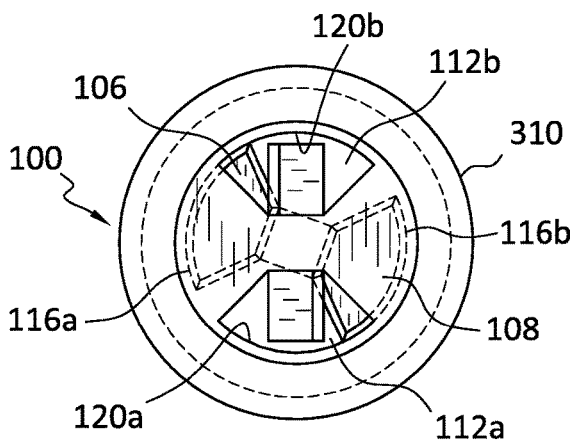
Figure 5B:
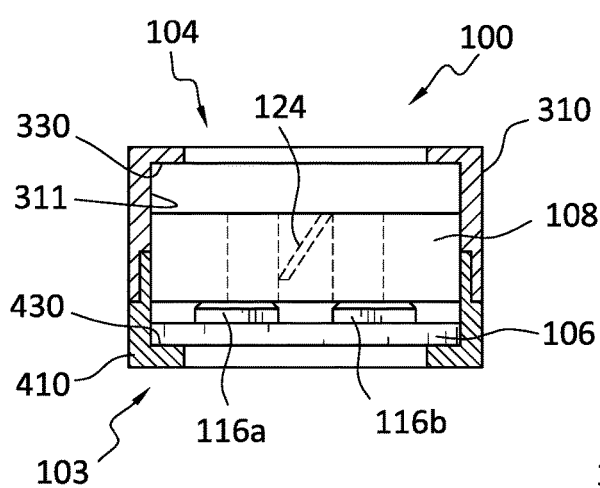
Figure 6B:
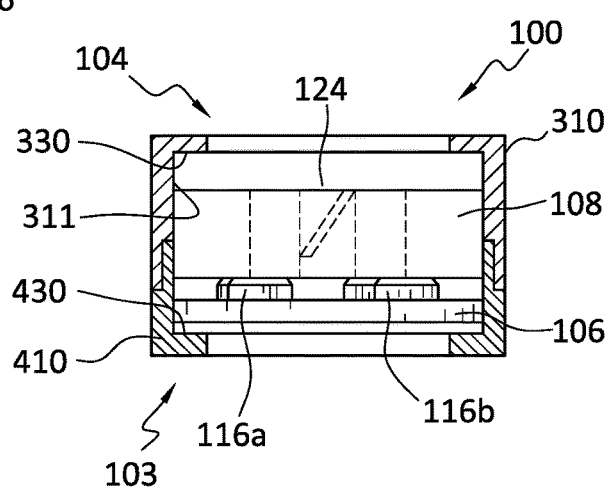

For example, and considering the first disk 106 as shown with reference to FIGS. 3 and 4, with first and second apertures 112a, 112b, the disk 106 is divided into four segments 114a-d, wherein each segment defines a quadrant constituted by a 90 degree pie-shaped slice of the first disk 106. As such, the first disk 106 may be thought of as including first, second, third and fourth segments 114a-d wherein the first segment 114a and the third segment 114c are provided with similarly shaped first and second apertures 112a, 112b, and the second segment 114b and the fourth segment 114d are completely filled with the material from which the first disk 106 is made. The second segment 114b and the fourth segment 114d thereby fill the space between the first aperture 112a and the second aperture 112b.

Figure 9:
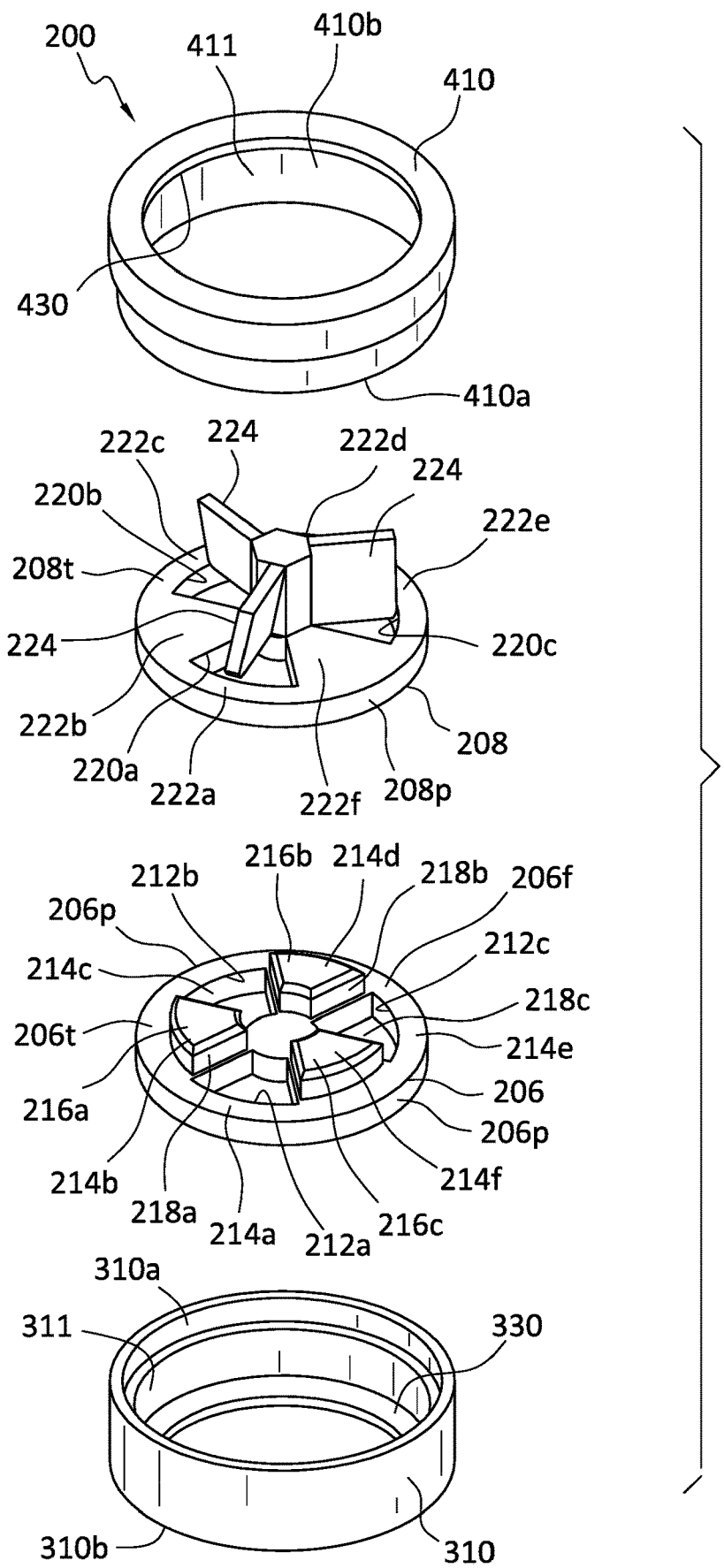
FIG. 9 is an exploded top view of the automatic flow restrictor in accordance with a second embodiment and as shown in FIG. 2.
Figure 10:
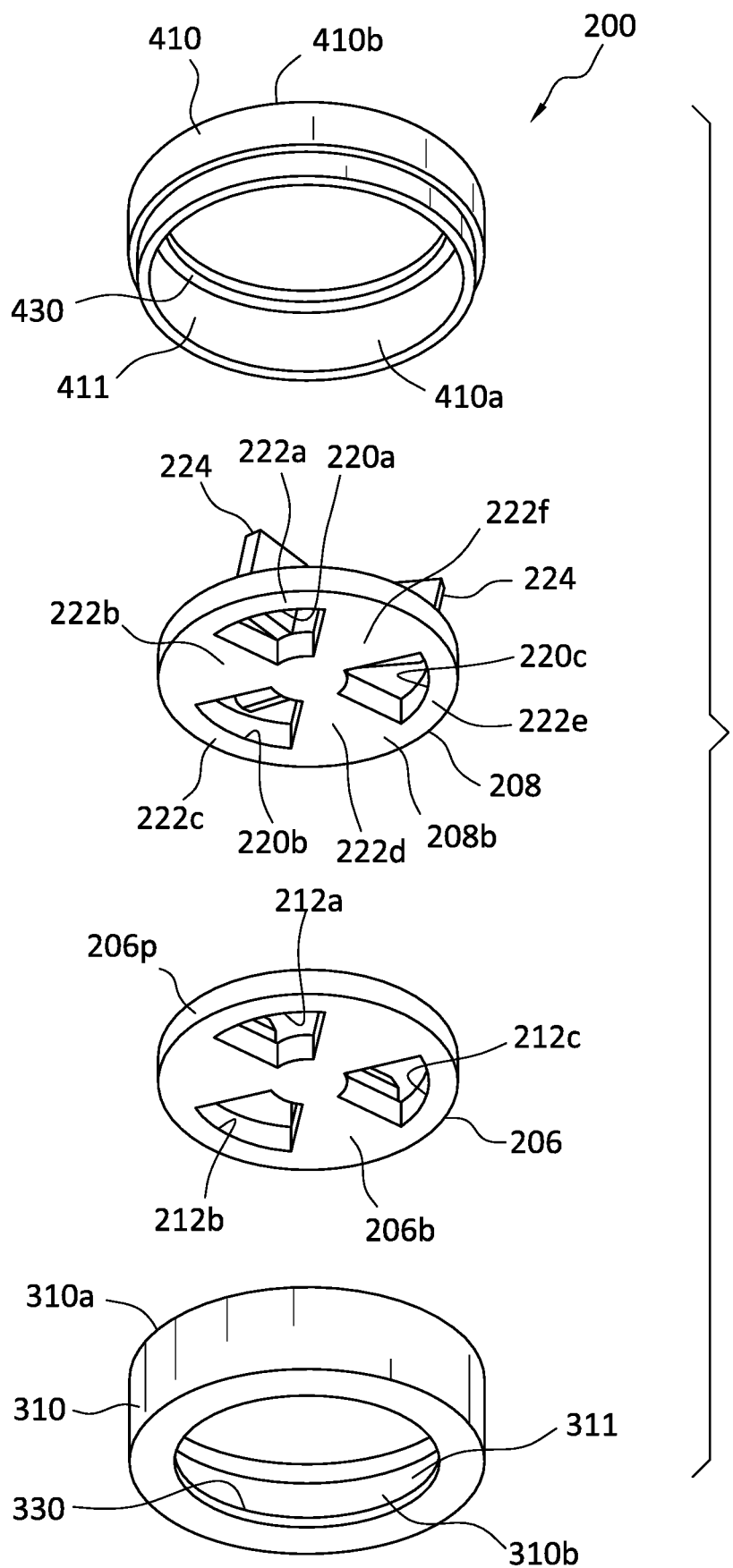
FIG. 10 is an exploded bottom view of the automatic flow restrictor in accordance with the second embodiment as shown in FIG. 9.
Figure 11A:
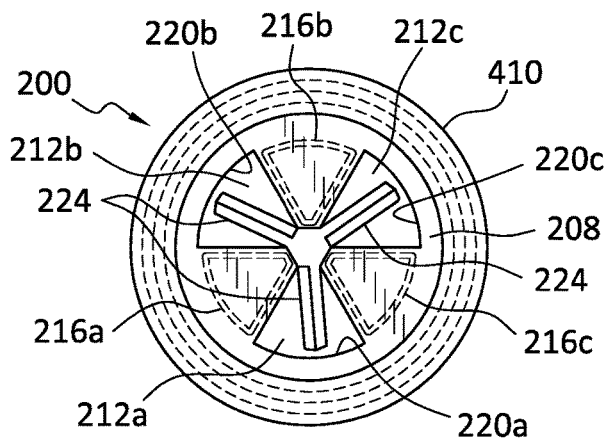
FIGS. 11A-B, 12A-B, 13A-B respectively showing a top plan view and a cross sectional view of the automatic flow restrictor shown in FIGS. 9 and 10 in stages of use showing the automatic flow restrictor allowing free flow, partial flow, and full flow restriction.
Figure 12A:
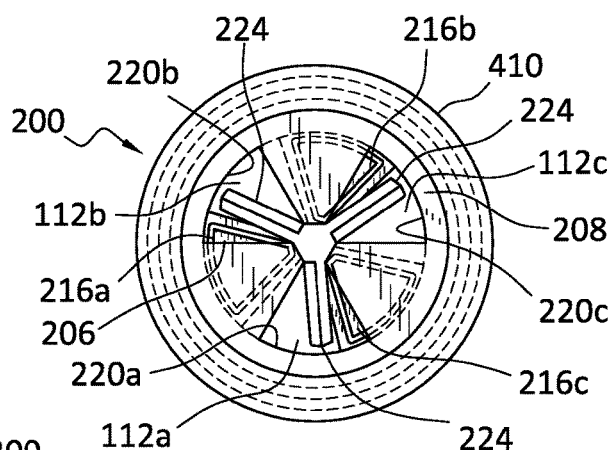
Figure 11B:
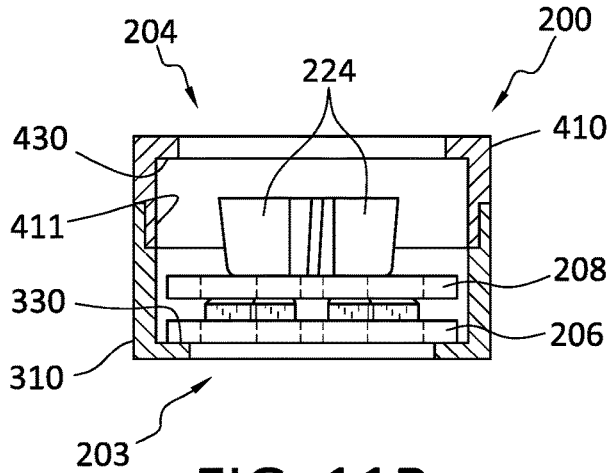
Figure 12B:
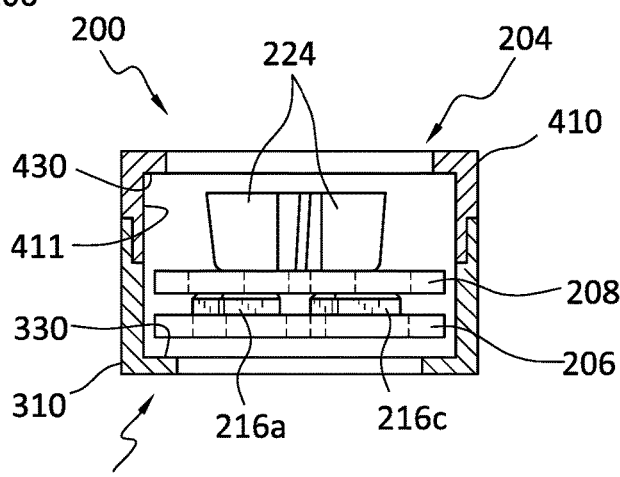
Figure 13A:
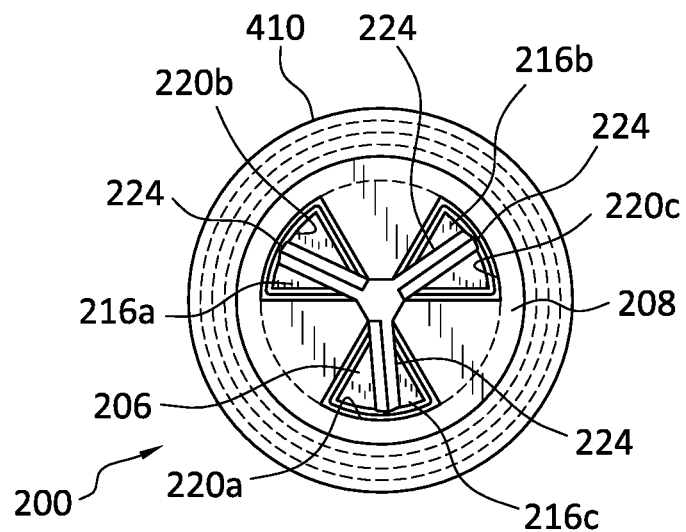
Figure 13B:
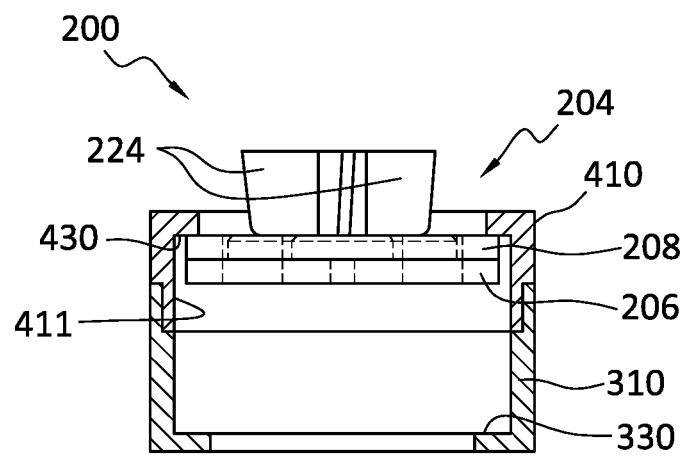

Similar, and with reference to FIGS. 9 and 10, the first disk 206 is constructed with a six-segment construction, wherein each segment defines a quadrant constituted by a 60-degree pie-shaped slice of the first disk 206. As such, the first disk 206 may be thought of as including first, second, third, fourth, fifth and sixth segments 214a-f wherein the first segment 214a, the third segment 214c, and the fifth segment 214e are provided with similarly shaped first, second, and third apertures 212a-c, and the second segment 214b, the fourth segment 214d, and the sixth segment 214f are completely filled with the material from which the first disk 206 is made. The second segment 214b, the fourth segment 214d, and the sixth segment 214f thereby fill the space between the first aperture 212a, the second aperture 212b, and the third aperture 212c.

The bottom surface 106b, 206b of the first disk 106, 206 is substantially flat. However, the top surface 106t, 206t of the first disk 106, 206 is provided with raised pads 116a-b, 216a-c along those segments not including an aperture, that is, the second segment 114b and the fourth segment 114d of the four quadrant embodiment shown with reference to FIGS. 3 and 4, and second segment 214b, the fourth segment 214d, and the sixth segment 214f of the six quadrant embodiment shown with reference to FIGS. 9 and 10.

As will be appreciated based upon the following disclosure, the respective raised pads 116a-b, 216a-c are shaped and dimensioned to fit within the apertures of the second disk that are opposed to the first disk 106, 206. As such, the edges 118a-b, 218a-c of the various raised pads 116a-b, 216a-c are tapered inwardly as the raised pads 116a-b, 216a-c extend from the foundation 106f, 206f of the top surface 106t, 206t of the first disk 106, 206 toward the apex of the raised pads 116a-b, 216a-c. This tapered shape allows for a smoother mating of pads 116a-b, 216a-c to apertures 120a-b, 220a-c and a snug fit when the raised pads 116a-b, 216a-c are aligned with apertures 120a-b, 220a-c of the second disk 108, 208 and fit therein.

With regard to the second disk 108, 208, the second disk 108, 208 also has several configurations to match the configurations of the first disk 106, 206. As will be appreciated based upon the following disclosure, it is important that the configurations of the first and second disks 106, 108, 206, 208 match when constructing an operating flow restrictor 100, 200 in accordance with the present invention; that is, a four quadrant first disk 106 should be used with a four quadrant second disk 108 and a six quadrant first disk 206 should be used with a six quadrant second disk 208. As with the first disk 106, 206, the common element amongst these various configurations is that the second disk 108, 208 includes a plurality of apertures 120a-b, 220a-c extending directly between and the top surface 108t, 208t thereof and the bottom surface 108b, 208b thereof. The apertures 120a-b, 220a-c are generally arcuate shaped and are symmetrically positioned about the circumference of the second disk 108, 208. For example, and considering the second disk 108 with first and second apertures 120a-b, the second disk 108 is divided into four segments 122a-d, wherein each segment defines a quadrant constituted by a 90 degree pie-shaped slice of the second disk 108. As such, the second disk 108 may be thought of as including first, second, third and fourth segments 122a-d wherein the first segment 122a and the third segment 122c are provided with similarly shaped first and second apertures 120a-b, and the second segment 122b and the fourth segment 122d are completely filled with the material from which the second disk 108 is made. The second segment 122b and the fourth segment 122d thereby fill the space between the first aperture 120a and the second aperture 120b.

Similar, the second disk 208 could be constructed with a six segment construction, wherein each segment defines a quadrant constituted by a 60 degree pie-shaped slice of the second disk 208. As such, the second disk 208 may be thought of as including first, second, third, fourth, fifth and sixth segments 222a-f wherein the first segment 222a, the third segment 222c, and the fifth segment 222e are provided with similarly shaped first, second, and third apertures 220a-c, and the second segment 222b, the fourth segment 222d, and the sixth segment 222f are completely filled with the material from which the second disk 208 is made. The second segment 222b, the fourth segment 222d, and the sixth segment 222f thereby fill the space between the first aperture 220a, the second aperture 220b, and the third aperture 220c The top surface 108t, 208t and the bottom surface 108b, 208b of the second disk 108, 208 are substantially flat. However, the apertures 120a-b, 220a-c of the second disk 108, 208 each include a fan blade 124, 224 in line with the void defined by the aperture 120a-b, 220a-c. Depending upon the thickness of the second disk 108, 208, the fan blades 124, 224 may be sized so as to be fully positioned within the void or the fan blades 124, 224 may be sized so as to extend external beyond the void, that is, extend beyond both the top surface 108t, 208t of the second disk 108, 208.

Figure 14:
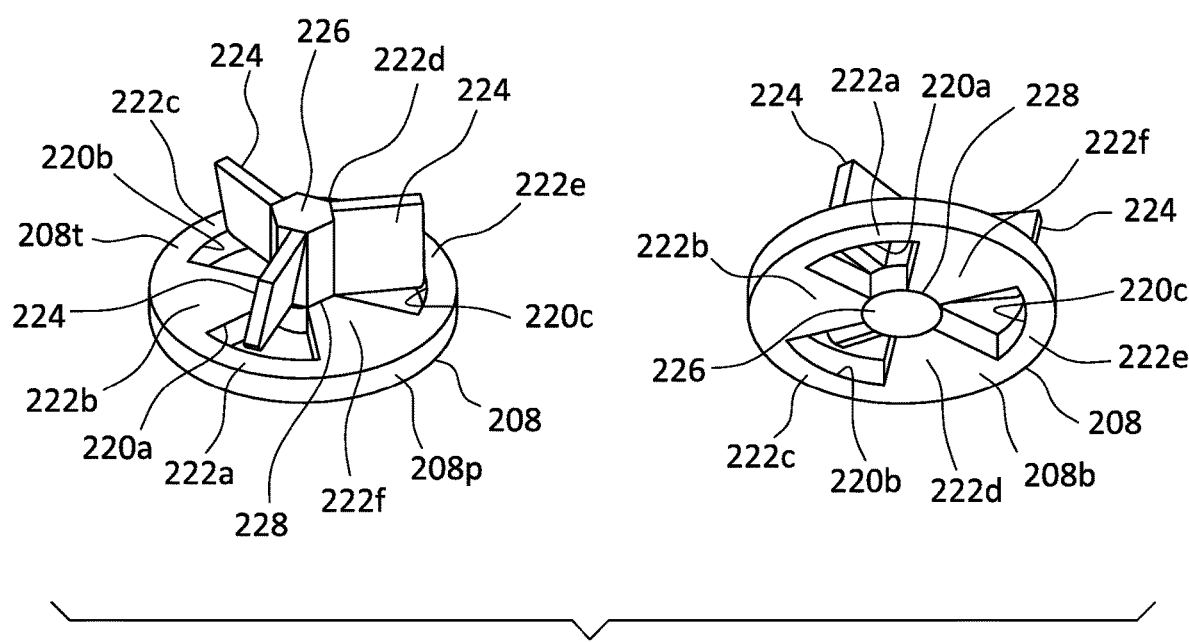
FIG. 14 shows top and bottom perspective views of a second disk in accordance with an alternate embodiment.
Figure 15:
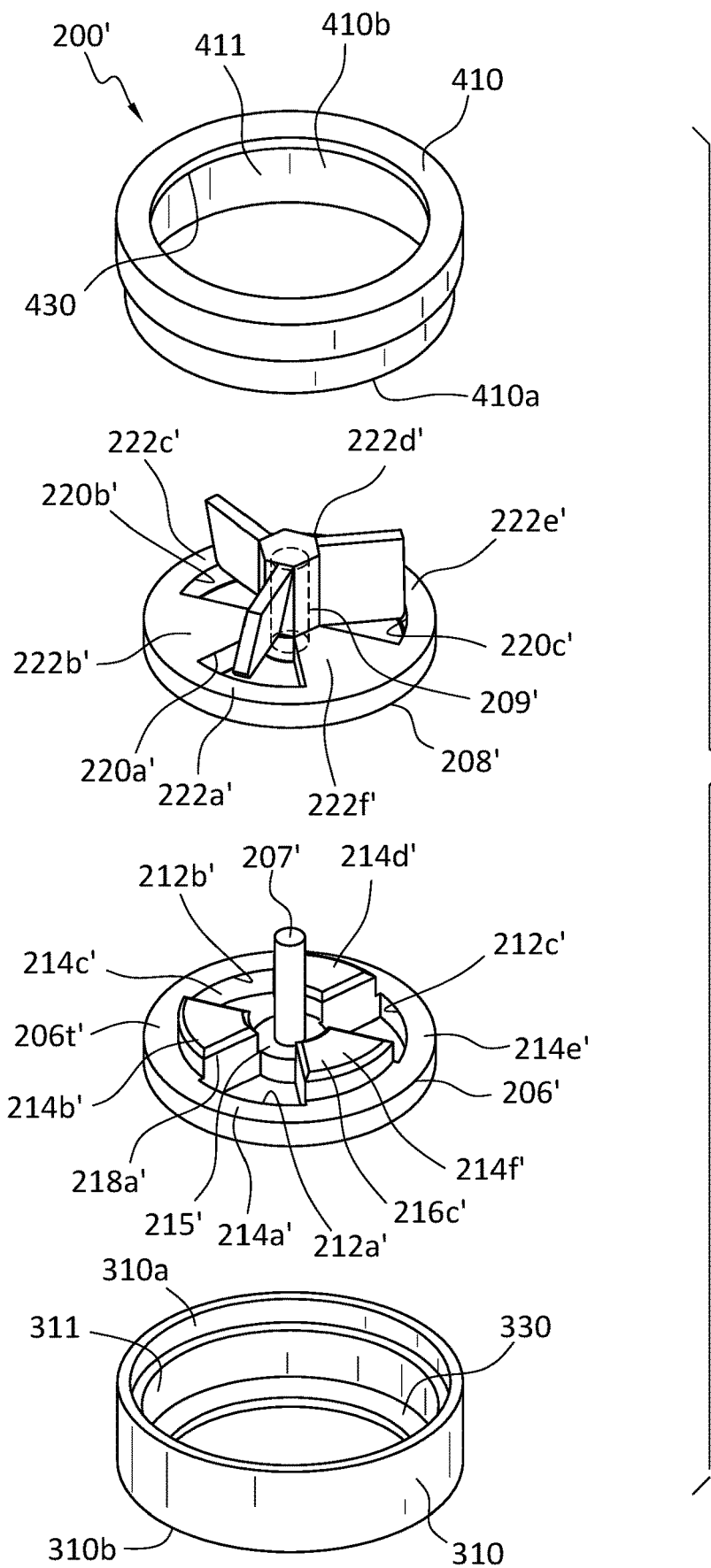
FIG. 15 is an exploded top view of the automatic flow restrictor in accordance with a further embodiment.
Figure 16:
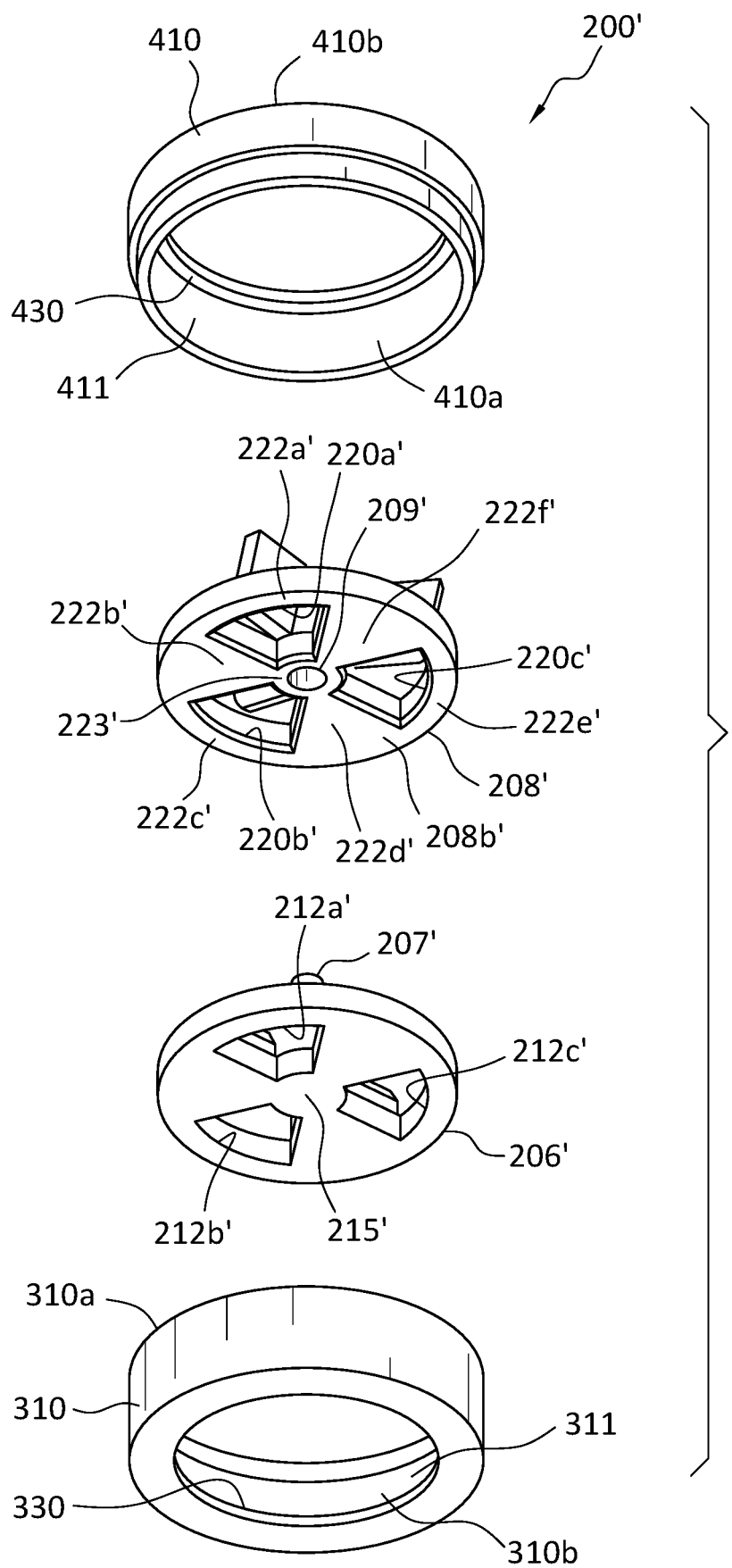
FIG. 16 is an exploded bottom view of the automatic flow restrictor in accordance with the further embodiment as shown in FIG. 15.
Figure 17A:
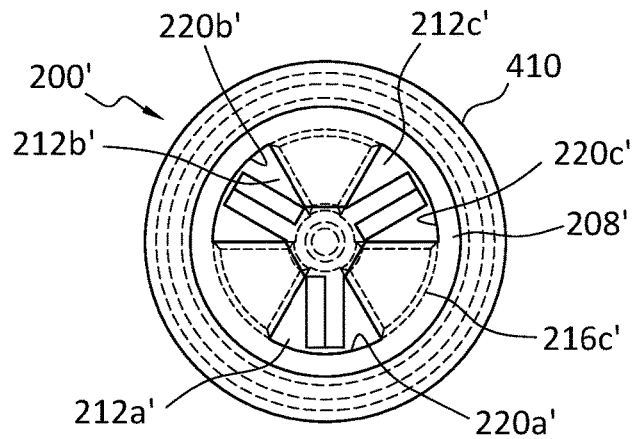
FIGS. 17A-B, 18A-B, and 19A-B respectively showing a top plan view and a cross sectional view of the automatic flow restrictor shown in FIGS. 15 and 16 in stages of use showing the automatic flow restrictor allowing free flow, partial flow, and full flow restriction.
Figure 18A:
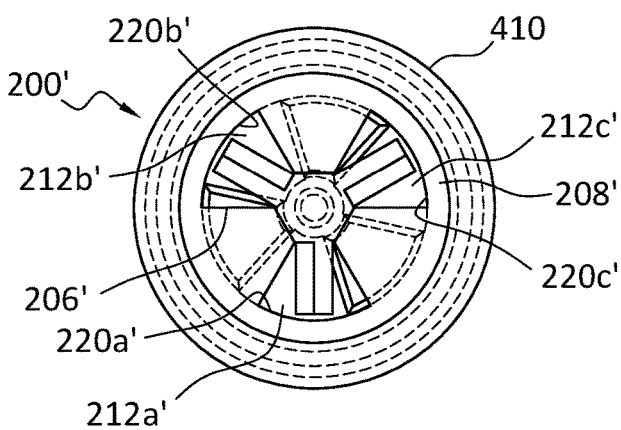
Figure 17B:
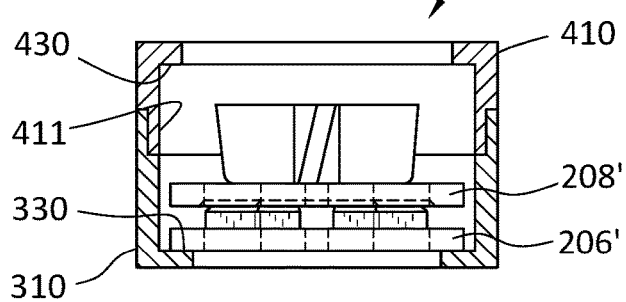
Figure 18B:
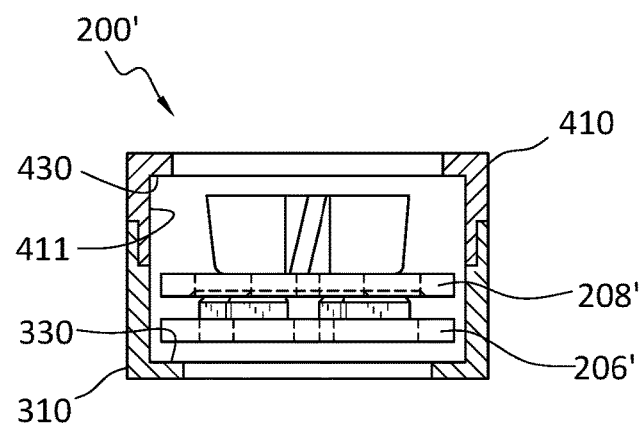
Figure 19A:
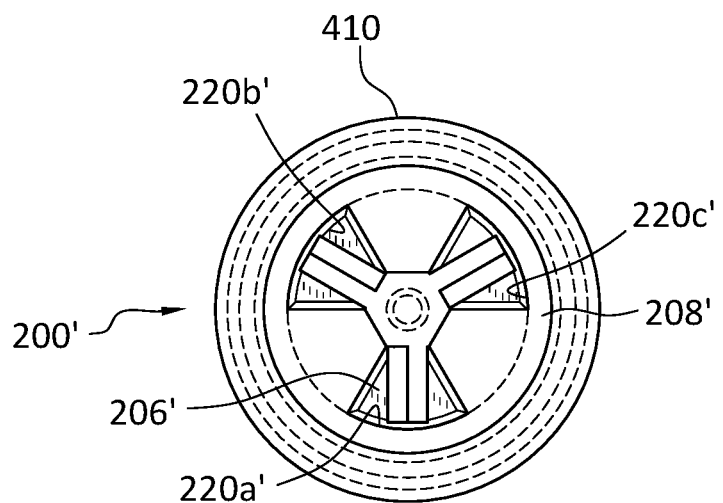
Figure 19B:
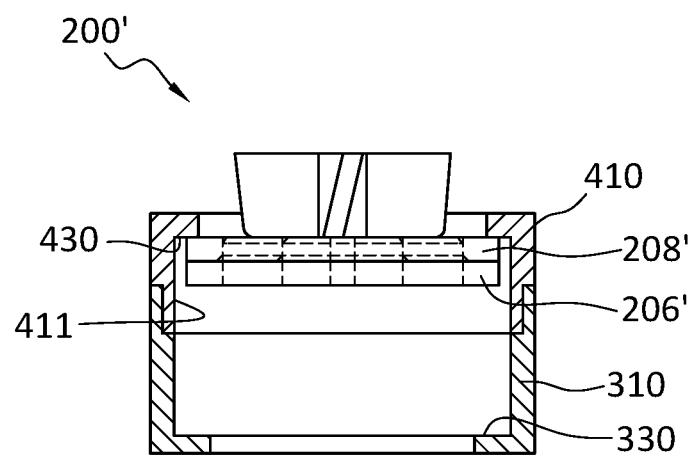

It is also appreciated that the fan blades 124, 224 may be integrally formed with the second disk 108, 208 as shown with reference to FIGS. 3, 4, 9 and 10 or the fan blades 224 may be separately formed with a central supporting member 226 that is positioned at the center point 228 between the various apertures of the second disk as shown with reference to FIG. 14.

The first and second disks 106, 108, 206, 208 are housed within and between the cylindrical first and second housing members 310, 410 that are shaped and dimensioned for positioning within the riser 18. The cylindrical first and second housing members 310, 410 are substantially mirror images of each other and therefore allow for positioning of the first and second disks 106, 108, 206, 208 therebetween with either housing member being at the inlet end 103, 203 or outlet end 104, 204 of the flow restrictor 100, 200. Considering the embodiment as shown in FIGS. 3 to 7 wherein the first housing member 310 is at the outlet end 104 of the flow restrictor 100 and the embodiment shown in FIGS. 8 to 13 wherein the second housing member 410 is at the outlet end 204 of the flow restrictor 200, each of the first housing member 310 and the second housing member 410 includes a first end 310a, 410a and an second end 310b, 410b. The first and second disks 106, 108, 206, 208 are placed in-line in the cylindrical first and second housing members 310, 410 either with the first disk 106, 206 or the second disk 108, 208 adjacent to the first end 310a, 410a and the other disk adjacent the second end 310b, 410b. The second ends 310b, 410b of both the first and second housing members 310, 410 are provided with internally directed ridges 330, 430 that help in maintaining the first and second disks 106, 108, 206, 208 within the cylindrical housing member 310, 410 as the water pressure will force the first and second disks 106, 108, 206, 208 in toward the outlet end 104, 204 of the flow restrictor 100, 200 while the opposite ridges 330, 430 prevent the first and second disks 106, 108, 206, 208 from fall out of the housing 500 at the inlet end 103, 203. The first ends 310a, 410a are shaped and dimensioned to mating in a frictional fit arrangement that may be fixedly secured together with adhesive or other bonding mechanism. In accordance with a preferred embodiment, the first end 310a of the first housing member 310 is structured as a female structured to receive the male structure at the first end 410a of the second housing member 410.

In particular, the second disk 108, 208 is positioned within the cylindrical first and second housing members 310, 410 such that the top surface 108t, 208t thereof faces the outlet end 104, 204 of the flow restrictor 100, 200 and the bottom surface 108b, 208b thereof faces the top surface 106t, 206t of the first disk 106, 206. The bottom surface 106b, 206b of the first disk 106, 206 faces the inlet end 103, 203 of the flow restrictor 100, 200.

In operation, and as shown with reference to FIGS. 5A-B, 6A-B, 7A-B, 11A-B, 12A-B, and 13A-B, the apertures 112a-b, 212a-c of the first disk 106, 206 are aligned with the apertures 120a-b, 220a-c of the second disk 108, 208 so that fluid can pass freely through both disks 106, 108, 206, 208 (see FIGS. 5A-B and 11A-B). Because the second disk 108, 208 has fan blades 124, 224, when the water flowing through the apertures 120a-b, 220a-c of the second disk 108, 208 exceeds a certain rate, the fan blades 124, 224 which are positioned in-line or in the apertures 120a-b, 220a-c of the second disk 108, 208 will cause the second disk 108, 208 to begin to rotate (see FIGS. 6A-B and 12A-B where the second disk 108, 208 has been partial rotated to move the apertures 112a-b, 212a-c of the first disk 106, 206 out of alignment with the apertures 120a-b, 220a-c of the second disk 108, 208 and partially close the apertures 112a-b, 212a-c, 120a-b, 220a-c, that is, the apertures 112a-b, 212a-c, 120a-b, 220a-c are covered by respective filled segments 114b, 114d, 214b, 214d, 214f, 122b, 122d, 222b, 222d, 222f to limit the flow of water therethrough). When the second disk 108, 208 rotates enough, the raised pads 116a-b, 216a-c of the first disk 106, 206 will come in substantial alignment with the apertures of the second disk 108, 208 and the suction of the fluid trying to pass through the apertures along with the pressure behind the first and second disks 106, 108, 206, 208 will cause the raised pads 116a-b, 216a-c of the first disk 106, 206 to fall into place and to fully engage or set into the apertures 120a-b, 220a-c of the second disk 108, 208 (see FIGS. 7A-B and 13A-B). In doing so, the apertures 112a-b, 212a-c of the first disk 106, 206 and the apertures 120a-b, 220a-c of the second disk 108, 208 are closed, that is, that is, the apertures 112a-b, 212a-c, 120a-b, 220a-c are covered by respective filled segments 114b, 114d, 214b, 214d, 214f, 122b, 122d, 222b, 222d, 222f, and the flow of fluid therethrough is reduced.

As mentioned above, the respective surfaces of the first and second disks may be varied without departing from the spirit of the present invention. For example, and with reference to FIG. 8, the top surface 106t of the first disk 106 and the bottom surface 108b of the second disk 108 may be formed with extending raised surfaces 117a-b, 119a-b along the respective second and fourth segments 114b, 114d, 122b, 122d that interlock when the disks 106, 108 are moved to their closed orientation. In particular, when the disks 106, 108 are moved to their closed configuration the raised surfaces 117*a-b* of the second and fourth segments 114*b*, 114*d* of the first disk 106 sit between the raised surfaces 119*a-b* of the second and fourth segments 122*b*, 122*d* of the second disk 108. Similar, when the disks 106, 108 are moved to their closed configuration, the raised surfaces 119 of the second and fourth segments 122*b*, 122*d* of the second disk 108 sit between the raised surfaces 117*a-b* of the second and fourth segments 114*b*, 114*d* of the first disk 106.

Further, and with reference to FIGS. 15, 16, 17A, 17B, 18A, 18B, 19A, and 19B, a flow restrictor 200' embodiment similar to that disclosed with references to FIGS. 9 to 13 is disclosed. However, and in contrast to the embodiment of FIGS. 9 to 13, the first disk 206' is provided with a centrally located pivot rod 207' that is shaped and dimensioned to fit within a recess 209' formed along the second disk 208'. In consideration of the following description of this embodiment, it should be appreciated only those elements that differ from the prior embodiment are described herein and those elements not described herein are substantially the same as described above with reference to FIGS. 9 to 13.

Considering now the first disk 206', it includes a six-segment construction, wherein each segment defines a quadrant constituted by a 60-degree pie-shaped slice of the first disk 206'. As such, the first disk 206' may be thought of as including first, second, third, fourth, fifth and sixth segments 214*a-f* wherein the first segment 214*a*', the third segment 214*c*', and the fifth segment 214*e*' are provided with similarly shaped first, second, and third apertures 212*a-c*', and the second segment 214*b*', the fourth segment 214*d*', and the sixth segment 214*f* are completely filled with the material from which the first disk 206' is made. The second segment 214*b*', the fourth segment 214*d*', and the sixth segment 214*f* thereby fill the space between the first aperture 212*a*', the second aperture 212*b*', and the third aperture 212*c*'. Connecting the segments 214*a-f* at the center of the first disk 206' is a central hub 215'. The central hub 215' includes an upwardly extending cylindrical pivot rod 207' that extends upwardly from the top surface 206*t*' of the first disk 206'.

With regard to the second disk 208', it also includes a six-segment construction, wherein each segment defines a quadrant constituted by a 60 degree pie-shaped slice of the second disk 208'. As such, the second disk 208' may be thought of as including first, second, third, fourth, fifth and sixth segments 222*a-f* wherein the first segment 222*a*', the third segment 222*c*', and the fifth segment 222*e*' are provided with similarly shaped first, second, and third apertures 220*a-c*', and the second segment 222*b*', the fourth segment 222*d*', and the sixth segment 222*f* are completely filled with the material from which the second disk 208' is made. The second segment 222*b*', the fourth segment 222*d*', and the sixth segment 222*f* thereby fill the space between the first aperture 220*a*', the second aperture 220*b*', and the third aperture 220*c*'. Connecting the segments 220*a-f* at the center of the second disk 208' is a central hub 223'. The central hub 223' includes a cylindrical recess 209' along the bottom surface 208*b*' of the second disk 208'. With the first and second disks 206', 208' assembled as described above with regard to FIGS. 9 to 13, the cylindrical pivot rod 207' fits within the cylindrical recess 209' so as to control movement of the first and second disks 206', 208' relative to each other.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An automatic flow restrictor for a sprinkler head, comprising:
   a first disk and a second disk, the first disk and the second disk moving relative to each other so as to take a first orientation where water being pumped through a main line tubing member is free to pass through the flow restrictor and exit out the sprinkler head with little resistance to flow, and a second orientation where water is restricted from passing therethrough;
   the first disk includes a top surface and a bottom surface, the first disk further including a plurality of apertures extending directly between the top surface and the bottom surface; and
   the second disk includes a top surface and a bottom surface, the second disk further including a plurality of apertures extending directly between the top surface and the bottom surface, wherein a fan blade is aligned with at least one of the apertures from the second disk;
   wherein the top surface of the first disk includes raised pads shaped and dimensioned to fit within the apertures of the second disk that are opposed to the first disk.

2. The flow restrictor according to claim 1, further including a housing in which the first disk and the second disk are positioned.

3. The flow restrictor according to claim 2, wherein the housing includes cylindrical first and second housing members that are shaped and dimensioned for positioning within a riser.

4. The flow restrictor according to claim 1, wherein the apertures of the first disk and the apertures of the second disk are generally arcuate shaped.

5. The flow restrictor according to claim 4, wherein the apertures of the first disk and the apertures of the second disk are symmetrically positioned about a circumference thereof.

6. The flow restrictor according to claim 1, wherein the first disk includes two apertures and the second disk includes two apertures.

7. The flow restrictor according to claim 1, wherein the first disk includes three apertures and the second disk includes three apertures.

8. The flow restrictor according to claim 1, wherein the fan blade of the second disk is sized to extend external beyond a void defined by the aperture such that it extends beyond the top surface of the second disk.

9. The flow restrictor according to claim 1, wherein the fan blade is integrally formed with the second disk.

10. The flow restrictor according to claim 1, wherein the fan blade is separately formed with a central supporting member that is positioned at a center point of the second disk.

11. An automatic flow restrictor for a sprinkler head, comprising:
    a first disk and a second disk, the first disk and the second disk moving relative to each other so as to take a first orientation where water being pumped through a main line tubing member is free to pass through the flow restrictor and exit out the sprinkler head with little resistance to flow, and a second orientation where water is restricted from passing therethrough;
    the first disk includes a top surface and a bottom surface, the first disk further including a plurality of apertures extending directly between the top surface and the bottom surface; and
    the second disk includes a top surface and a bottom surface, the second disk further including a plurality of apertures extending directly between the top surface and the bottom surface, wherein a fan blade is aligned with at least one of the apertures from the second disk; wherein fan blades of the second disk are fully positioned within a void defined by the apertures of the second disk.

12. The flow restrictor according to claim 11, further including a housing in which the first disk and the second disk are positioned.

13. The flow restrictor according to claim 12, wherein the housing includes cylindrical first and second housing members that are shaped and dimensioned for positioning within a riser.

14. The flow restrictor according to claim 11, wherein the apertures of the first disk and the apertures of the second disk are generally arcuate shaped.

15. The flow restrictor according to claim 14, wherein the apertures of the first disk and the apertures of the second disk are symmetrically positioned about a circumference thereof.

16. The flow restrictor according to claim 11, wherein the first disk includes two apertures and the second disk includes two apertures.

17. The flow restrictor according to claim 11, wherein the first disk includes three apertures and the second disk includes three apertures.

18. The flow restrictor according to claim 11, wherein the fan blade of the second disk is sized to extend external beyond a void defined by the aperture such that it extends beyond the top surface of the second disk.

19. The flow restrictor according to claim 11, wherein the fan blade is integrally formed with the second disk.

20. The flow restrictor according to claim 11, wherein the fan blade is separately formed with a central supporting member that is positioned at a center point of the second disk.

* * * * *